(12) United States Patent
Schilder et al.

(10) Patent No.: US 12,305,738 B1
(45) Date of Patent: May 20, 2025

(54) ELECTRIC DRIVE UNIT FOR A MOTOR VEHICLE

(71) Applicant: MERCEDES-BENZ GROUP AG, Stuttgart (DE)

(72) Inventors: Tobias Schilder, Ludwigsburg (DE); Jonathan Zeibig, Aalen (DE); Tobias Haerter, Stuttgart (DE); Carsten Gitt, Stuttgart (DE); Klaus Riedl, Tübingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/836,211

(22) PCT Filed: Feb. 3, 2023

(86) PCT No.: PCT/EP2023/052669
§ 371 (c)(1),
(2) Date: Aug. 6, 2024

(87) PCT Pub. No.: WO2023/148325
PCT Pub. Date: Aug. 10, 2023

(30) Foreign Application Priority Data

Feb. 7, 2022 (DE) ..................... 10 2022 000 463.1

(51) Int. Cl.
*B60K 17/04* (2006.01)
*B60K 1/02* (2006.01)
(Continued)

(52) U.S. Cl.
CPC ........... *F16H 37/0806* (2013.01); *B60K 1/02* (2013.01); *B60K 17/046* (2013.01);
(Continued)

(58) Field of Classification Search
CPC .......... B60K 1/02–2001/0494; F16H 37/0806; F16H 48/06; F16H 48/10–48/11
See application file for complete search history.

(56) References Cited

U.S. PATENT DOCUMENTS

| 8,651,991 B1 | 2/2014 | Sten et al. |
| 9,701,187 B2 | 7/2017 | Smetana et al. |

(Continued)

FOREIGN PATENT DOCUMENTS

| CN | 113696676 A | 11/2021 |
| DE | 102012016508 A1 | 5/2014 |

(Continued)

OTHER PUBLICATIONS

International Search Report and Written Opinion mailed May 10, 2023 in related/corresponding International Application No. PCT/EP2023/052669.

(Continued)

*Primary Examiner* — Tinh Dang
(74) *Attorney, Agent, or Firm* — PATENT PORTFOLIO BUILDERS PLLC

(57) ABSTRACT

An electric drive unit has a first electric engine with a first rotor, a second electric engine which with a second rotor, and a gear unit having a differential, which has exactly three first shafts arranged coaxially to each other. The three first shafts are a sum shaft to which the first rotor is connected in such a way that torques supplied by the first rotor can be introduced into the gear unit via the sum shaft, a first differential shaft coupled to a first vehicle wheel in such a way that torques can be discharged from the gear unit via the first differential shaft and transmitted onto the first vehicle wheel, and a second differential shaft coupled to a second vehicle wheel in such a way that torques can be discharged (Continued)

Figure 1:
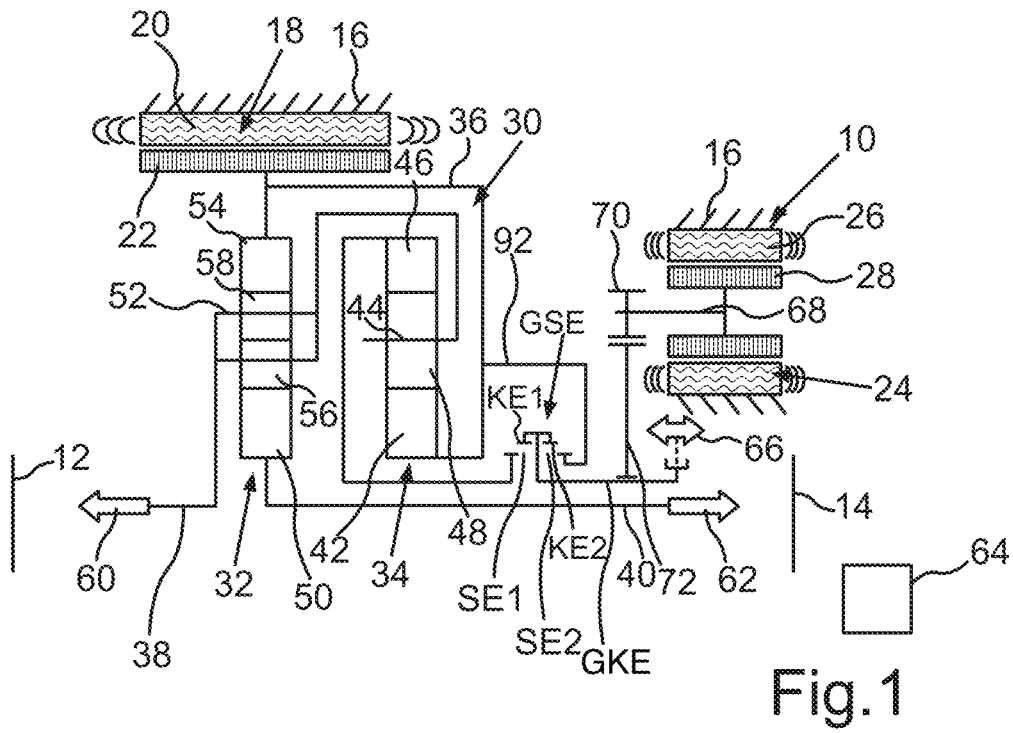

from the gear unit via the second differential shaft and transmitted onto the second vehicle wheel.

8 Claims, 1 Drawing Sheet

(51) Int. Cl.
*B60K 17/16* (2006.01)
*F16H 37/08* (2006.01)
*F16H 48/06* (2006.01)
*F16H 48/10* (2012.01)
*F16H 48/11* (2012.01)

(52) U.S. Cl.
CPC ............ *B60K 17/165* (2013.01); *F16H 48/06* (2013.01); *F16H 48/10* (2013.01); *F16H 48/11* (2013.01)

(56) References Cited

U.S. PATENT DOCUMENTS

| | | | |
|---|---|---|---|
| 10,641,375 B2 | 5/2020 | Kurth | |
| 2020/0282827 A1* | 9/2020 | Kaltenbach | B60K 1/02 |
| 2022/0410684 A1* | 12/2022 | Wang | B60K 23/04 |

FOREIGN PATENT DOCUMENTS

| | | |
|---|---|---|
| DE | 102013202382 A1 | 8/2014 |
| DE | 102014103485 A1 | 9/2014 |
| DE | 102014210549 A1 | 12/2015 |
| DE | 102015223131 A1 | 5/2017 |
| DE | 102018117206 A1 | 1/2020 |
| DE | 102022000462 B3 | 3/2023 |
| DE | 102022000463 B3 | 3/2023 |
| EP | 3348867 A1 | 7/2018 |
| EP | 3140144 B1 | 12/2019 |
| GB | 2348253 A | 9/2000 |
| JP | H05169991 A | 7/1993 |
| JP | 2019044865 A | 3/2019 |
| JP | 2021156378 A | 10/2021 |

OTHER PUBLICATIONS

International Search Report and Written Opinion mailed May 10, 2023 in related/corresponding International Application No. PCT/EP2023/052671.

Office Action created Jul. 7, 2022 in related/corresponding DE Application No. 10 2022 000 463.1.

Office Action created Jun. 30, 2022 in related/corresponding DE Application No. 10 2022 000 462.3.

* cited by examiner

ELECTRIC DRIVE UNIT FOR A MOTOR VEHICLE

BACKGROUND AND SUMMARY OF THE INVENTION

Exemplary embodiments of the invention relate to an electric drive unit for a motor vehicle, in particular for a motor car.

A torque distribution device is known from EP 3 348 867 A1, having a torque distribution engine, a first sun gear, and a plurality of first planetary gears which are arranged on an outer circumferential side of the first sun gear and engage into the first sun gear. A second sun gear is also provided which has a gearing diameter greater than a gearing diameter of the first sun gear.

Electric drive units are known from JP 2021/156 378 A, DE 10 2013 202 382 A1 and GB 2 348 253 A, some for a purely electric drive, some for a hybrid drive.

Drive units are known from DE 10 2014 103 485 A1 and the generic DE 10 2014 210 549 A1, in which a gearbox having a differential and an additional planetary gear set and two drive engines are provided, wherein the drive engines are connected or can be connected to different shafts of the gearbox.

Exemplary embodiments of the present invention are directed to an electric drive unit for a motor vehicle, in particular for a motor car, such that a particularly advantageous torque distribution can be achieved in a particularly needs-based manner.

The invention relates to an electric drive unit for a motor vehicle, in particular for a motor car preferably formed as a passenger car. This means that, when fully manufactured, the motor vehicle also simply referred to as a vehicle has the electric drive unit and can be driven electrically by means of the electric drive unit, in particular purely electrically. For example, when fully manufactured, the motor vehicle has at least or exactly two axles, which are also referred to as vehicle axles, arranged successively and thus one behind the other in the vehicle longitudinal direction. The respective vehicle axle has at least or exactly two vehicle wheels, also referred to as wheels, wherein the respective vehicle wheels of the respective vehicle axle are arranged for example on opposite sides of the motor vehicle to each other in the vehicle transverse direction. In this case, the electric drive unit is a component part, for example, of one, in particular exactly one, of the vehicle axles, wherein the vehicle wheels of the one vehicle axle can be driven by means of the electric drive unit. When the vehicle wheels are referred to in the following, unless otherwise stated, this means the vehicle wheels of the one vehicle axle that can be driven electrically, in particular purely electrically, by means of the electric drive unit. By driving the vehicle wheels, the motor vehicle can be driven electrically as a whole, in particular purely electrically.

The vehicle wheels of the one axle and the vehicle wheels of the other axle are ground contact elements, by which the motor vehicle can be supported or is supported downwards on a ground in the vertical direction of the vehicle. If the motor vehicle drives along the ground whilst the motor vehicle are supported downwards on the ground by the ground contact elements in the vertical direction of the vehicle, the ground contact elements roll, in particular directly, along the ground.

The electric drive unit has a first electric engine which has a first rotor. In particular, the first electric engine also has a first stator. For example, the first rotor can be driven by means of the first stator and can be rotated thereby around a first engine rotational axis in relation to the first stator. For example, the electric drive unit has a housing, wherein the first rotor can be rotated around the first engine rotational axis in relation to the housing. Furthermore, the electric drive unit has a second electric engine which has a second rotor. In particular, the second electric engine has a second stator. For example, the second rotor can be driven by means of the second stator and can be rotated thereby around a second engine rotational axis in relation to the second stator and preferably also in relation to the housing. Preferably, the electric engines are arranged coaxially to each other so that the engine rotational axes coincide. It is conceivable that the electric engines are arranged with respect to each other in such a way that the engine rotational axes run parallel to each other and are spaced apart from each other.

The first electric engine can supply first drive torques, in particular for driving the vehicle wheels, via its first rotor. The second electric engine can supply second drive torques, in particular for driving the vehicle wheels, via its second rotor. The electric drive unit also has a gear unit, which has, i.e., comprises, a differential. In particular, the differential is arranged at least partially in the housing. The differential has exactly three first shafts, arranged coaxially to each other, specifically a sum shaft, a first differential shaft, and a second differential shaft. This means that the first shafts can be rotated around a first shaft rotational axis, common to the first shafts, in relation to the housing. In particular, the differential is an epicyclic transmission and thus is designed as an epicyclic transmission differential. Very particularly, the differential is preferably designed as a planetary transmission and thus as a planetary transmission differential, which is also simply referred to as a planetary differential. Alternatively, the differential can be designed as a bevel gear differential, for example. In this case, for example, the sum shaft would be a differential cage, also known as a differential basket, on which, for example, compensating gears, which are designed as bevel gears, are mounted so that they can rotate relative to the differential basket about a compensating gear rotational axis common to the equalizing gears. The bevel gear differential can further have output gears, which are similarly designed as bevel gears, wherein the compensating gears mesh with the output gears. One of the output gears would then be connected to one of the differential shafts, for example, in a rotationally fixed manner, and the other output gear would be connected to the other differential shaft in a rotationally fixed manner.

The differential is also referred to as a differential transmission. The first rotor is connected to the sum shaft in such a way, i.e., is coupled or joined in such a way to the sum shaft, in particular in a torque-transmitting manner, that torques supplied by the first rotor can be introduced into the gear unit by the sum shaft. In other words, torques originating from the first rotor can be introduced into the gear unit at the sum shaft. The respective torque that is or can be supplied by the first rotor is the respective, first drive torque, for example. For example, the first rotor is connected to the sum shaft, in particular permanently, in a torque-transmitting, in particular rotationally fixed manner. The sum shaft is thus a first drive, also referred to as a first input, of the differential, in particular the gear unit, since the respective, first drive torque can be introduced into the differential and therefore into the gear unit via the sum shaft.

The first differential shaft is coupled or connected to a first of the vehicle wheels, in particular in a torque-transmitting manner, in such a way that torques, also referred to as first output torques, can be discharged from the gear unit via the first differential shaft and can be transmitted onto the first vehicle wheel, in particular in order to thereby drive the first vehicle wheel. The first differential shaft is thus a first output drive, also referred to as a first output, of the differential and in particular of the gear unit overall, since the respective, first output torque can be discharged from the gear unit via the first differential shaft and can be transmitted to or onto the first vehicle wheel, in particular in order to thereby drive the first vehicle wheel. Again, expressed in other words, the first differential shaft is coupled in such a way to the first vehicle wheel, in particular permanently and in a torque-transmitting manner, that the first output torques originating from the gear unit can be discharged at the first differential shaft from the gear unit onto the first vehicle wheel. For example, the first differential shaft is coupled, i.e., connected, to the first vehicle wheel, in particular permanently, in a torque-transmitting, in particular rotationally fixed manner.

The second differential shaft is coupled to a second of the vehicle wheels, in particular in a torque-transmitting manner, in such a way that torques, also referred to as second output torques, can be discharged from the gear unit via the second differential shaft and can be transmitted onto the second vehicle wheel, in particular in order to thereby drive the second vehicle wheel. In particular, the first vehicle wheel and the second vehicle wheel are vehicle wheels of the same vehicle axle, in particular of the aforementioned one vehicle axle. The differential shaft is thus a second output drive, also referred to as a second output, of the differential and in particular of the gear unit overall, since the second output torques can be discharged from the gear unit via the second differential shaft and can be transmitted to or onto the second vehicle wheel. Expressed again in other words, the second output torques originating from the gear unit could be discharged at the second differential shaft from the gear unit onto the second vehicle wheel. For example, the first differential shaft is coupled, i.e., connected, to the first vehicle wheel, in particular permanently, in a torque-transmitting, in particular rotationally fixed manner. Furthermore, it is conceivable that, for example, the second differential shaft is coupled, i.e., connected, to the second vehicle wheel, in particular permanently, in a torque-transmitting, in particular rotationally fixed manner.

Furthermore, the gear unit has a superimposed planetary gear set, which is simply also referred to as a planetary gear set or planetary set and, in particular, is provided in addition to the differential. If, for example, the differential is a first planetary transmission or the aforementioned first planetary transmission, the superimposed planetary gear set is a second planetary transmission, for example. The superimposed planetary gear set has exactly three further shafts, specifically a sun gear, a planetary carrier, also referred to as a bridge, and a ring gear. The sun gear, the planetary carrier, and the ring gear are gear elements of the superimposed planetary gear set. Particularly if the respective gear element is not connected to the housing in a rotationally fixed manner, the respective gear element can be rotated around a planetary gear set rotational axis of the superimposed planetary gear set. In this case, it is preferable for the gear elements to be arranged coaxially to each other. In particular, it is conceivable that the differential is arranged coaxially to the superimposed planetary gear set, so that the planetary gear set rotational axis coincides with the shaft rotational axis. The planetary carrier is connected to the first differential shaft, in particular permanently, in a rotationally fixed manner.

In the context of the present disclosure, the feature that two components such as the first differential shaft and the planetary carrier are connected to each other in a rotationally fixed manner, is to be understood as meaning that the components connected to each other in a rotationally fixed manner are arranged coaxially to each other and, particularly when the components are driven, rotate together or simultaneously with the same angular velocity, in particular in relation to the housing, around a component rotational axis common to the components, such as for example the planetary gear set rotational axis. The feature that two components, such as the sum shaft and the first rotor, are coupled or connected to each other in a torque-transmitting manner means that the components are coupled or connected to each other in such a way that torques can be transmitted between the components, wherein if the components are connected to each other in a rotationally fixed manner, the components are also connected to each other in a torque-transmitting manner.

The feature that two components are permanently connected to each other in a torque-transmitting manner means that a switching element is not provided which can be switched between a coupling state connecting the components to each other in a torque-transmitting manner and a decoupling state in which no torques can be transmitted between the components, but the components are at all times or rather always and thus permanently connected to each other in a torque-transmitting manner, i.e., in such a way that a torque can be transmitted between the components. This means, for example, that one of the components can be driven by the respective other component or vice versa. In particular, the feature that the components are permanently connected to each other in a rotationally fixed manner means that a switching element is not provided which can be switched between a coupled state connecting the components to each other in a rotationally fixed manner and a decoupled state in which the components are decoupled from each other and rotatable relative to each other, in particular about the component rotational axis, so that for example no torques can be transmitted between the components, but the components are at all times or rather always, i.e., permanently, connected or coupled to each other in a rotationally fixed manner. Thus, in the context of the present disclosure, a rotationally fixed connection of two elements, in particular of two rotatably mounted elements, means that these two elements are arranged coaxially to one another and are connected to each other in such a way that they rotate at the same angular velocity. Furthermore, the feature that two components can be coupled or connected to each other in a torque-transmitting, in particular rotationally fixed manner, means that a switching element is assigned to the components which can be switched between a coupled state, in which the components are connected to each other in a torque-transmitting, in particular rotationally fixed manner, by means of the switching element, and a decoupled state, in which the components are decoupled from each other, so that the components can rotate relative to each other in particular around the component rotational axis and so that in particular no torques can be transmitted between the components.

Furthermore, it is provided in a manner known per se that the second rotor is or can be coupled to the ring gear in such a way that torques supplied by the second rotor can be introduced into the gear unit via the ring gear. In other words, the second rotor is or can be coupled to the ring gear in such a way that the respective second drive torque that is or can be supplied by the second rotor can be introduced into the gear unit via the ring gear. Expressed again in other words, the second rotor is or can be coupled to the ring gear in such a way that torques, i.e., the respective second drive torque, originating from the second rotor can be introduced into the gear unit at the ring gear.

Thus, the ring gear is a second drive, also referred to as a second input, of the superimposed planetary gear set and in particular of the gear unit as a whole, since the respective second drive torque that is or can be supplied by the second rotor can be introduced into the superimposed planetary gear set and in particular into the gear unit as a whole at the or via the ring gear.

Furthermore, a second switching unit is provided in a manner known per se, which is designed to couple the second rotor to the sum shaft, in particular in a torque-transmitting manner, in such a way that the respective second drive torque that is or can be supplied by the second rotor can be introduced into the gear unit via the sum shaft.

In order to be able to achieve a particularly advantageous torque distribution, also referred to as torque vectoring or a torque vectoring function, it is provided according to the invention that the sun gear is connected to the sum shaft, in particular permanently, in a rotationally fixed manner.

In order to be able to achieve a particularly advantageous torque distribution in a particularly needs-based manner, according to the invention the electric drive unit further has a first switching unit designed to couple the second rotor to the ring gear, in particular in a torque-transmitting manner, in such a way that the respective second drive torque that is or can be supplied by the second rotor can be introduced into the gear unit via the ring gear. For example, the first switching unit can be switched between a first coupled stated and a first decoupled state. In the first coupled state, the second rotor is connected to the ring gear in a torque-transmitting manner by means of the first switching unit. In the first decoupled state, the second rotor is decoupled from the ring gear, so that no torques can be transmitted between the second rotor and the ring gear.

In other words, the first switching unit is designed to couple the second rotor to the ring gear in such a way that torques originating from the second rotor can be introduced into the gear unit at the ring gear. The second switching unit is preferably designed to couple the second rotor to the sum shaft in such a way that torques originating from the second rotor can be introduced into the gear unit at the sum shaft. For example, the second switching unit can be switched between a second coupled stated and a second decoupled state. In the second coupled state, the second rotor is coupled to the sum shaft in a torque-transmitting manner by means of the second switching unit. In the second decoupled state, the second rotor is decoupled from the sum shaft, so that no torques can be transmitted between the sum shaft and the second rotor.

The respective, aforementioned first output torque results, for example, from the respective, first drive torque, introduced into the gear unit if necessary, and/or from the respective, second drive torque, introduced into the gear unit if necessary. The respective, second output torque results from the respective, first drive torque, introduced into the gear unit if necessary, and/or from the respective, second drive torque, introduced into the gear unit if necessary.

Torque distribution (torque vectoring) means the following in particular: The differential has a basic distribution for example, according to which a total torque introduced into the gear unit, in particular via the sum shaft, is shared or distributed to the outputs, i.e., to the differential shafts, and via these to the vehicle wheels. In particular, the basic distribution is defined, i.e., specified, by a mechanical construction of the differential. The total torque results, for example, from the respective, first drive torque and/or from the respective, second drive torque, wherein for example the total torque can then in particular result from the respective, first drive torque and from the respective, second drive torque when the second rotor provides the respective second drive torque and, in particular simultaneously, the first rotor provides the respective first drive torque and the first drive torque and the second drive torque are introduced into the differential gear, in particular simultaneously. In particular, by coupling the second rotor to the ring gear and thus to the superimposed planetary gear set, the differential can be influenced, for example, in particular by the fact that the respective second drive torque acts on the differential or is introduced into the differential, in such a way that, for example, the respective first drive torque or total torque introduced into the differential, in particular via the sum shaft, is not or not only shared or distributed to the outputs, i.e., to the differential shafts and via these to the vehicle wheels, according to the basic distribution, but according to a distribution that differs from the basic distribution, wherein the distribution can be varied in particular by varying the respective second drive torque or by varying an amount of the respective second drive torque, i.e., in particular by providing the different second drive torques. This allows, for example, the first output torque to be set to a first value, in particular a first amount, and the second output torque to be set, in particular simultaneously, to a second value that differs from the first value, in particular a second amount that differs from the first amount. The torque distribution is particularly advantageous when the motor vehicle is cornering, as a greater torque can then be allocated to the vehicle wheel on the outside of the bend than to the vehicle wheel on the inside of the bend, for example, in order to accelerate the motor vehicle advantageously out of a bend. Therefore, particularly advantageous driving dynamics can be achieved.

In addition, the differential has, for example, the function already sufficiently known from the prior art that the differential permits different speeds of the vehicle wheels when the motor vehicle is cornering, in particular in such a way that the vehicle wheel on the outside of the bend rotates at a higher speed than the vehicle wheel on the inside of the bend, in particular while the vehicle wheels are being driven or can be driven by means of the first rotor and/or by means of the second rotor, that is to say by means of the first electric engine and/or the second electric engine. In particular, the invention enables higher torques in torque vectoring compared to conventional solutions, especially without loss of drive power, so that a particularly strong yaw moment acting around the vehicle's vertical direction can be realized on the motor vehicle. Furthermore, the invention enables a particularly efficient drive with only one of the electric engines. In other words, the invention enables a particularly efficient single-engine operation, in which the vehicle wheels can be or are driven in terms of the electric engines by means of only one of the electric engines, whilst the vehicle wheels are not driven by the other electric engine. For this purpose, the second electric engine, for example, or the second rotor is disconnected from the ring gear and thus from the gear unit.

Furthermore, a particularly advantageous support mode, also referred to as a boost or boost mode, can be achieved by the invention. For this purpose, for example, the second rotor is or will be connected to the ring gear in a rotationally fixed manner so that, for example, the respective first drive torque and the respective second drive torque can be introduced into the gear unit, in particular simultaneously, so that, for example, a particularly powerful acceleration of the motor vehicle can be achieved.

In particular, it is conceivable that the first electric engine is arranged coaxially to the differential and/or coaxially to the superimposed planetary gear set, so that the first engine rotational axis coincides with the shaft rotational axis and/or with the planetary gear set rotational axis. It is conceivable that the second electric engine is arranged axially offset to the differential and/or to the superimposed planetary gear set, so that the second engine rotational axis runs parallel to the shaft rotational axis and/or parallel to the planetary gear set and is spaced apart from the shaft rotational axis and/or from the planetary gear set rotational axis.

For example, a first coupling element of the first switching unit can be moved, in particular, in the axial direction of the gear unit and thus along the shaft rotational axis or along the planetary gear set rotational axis, and/or translationally and/or relative to the housing, between at least one first coupled position that brings about the first coupled state and at least one first decoupled position that brings about the first decoupled state. In order to realize the torque distribution, for example, the first coupling element of the first switching unit is switched to the first coupling state of the coupling element or the first switching unit is in the first coupling state of the first switching unit. The first coupling element can comprise a first sliding sleeve, for example.

For example, a second coupling element of the second switching unit can be moved, in particular, in the axial direction of the gear unit and/or translationally and/or relative to the housing, between at least one second coupled position that brings about the second coupled state and at least one second decoupled position that brings about the second decoupled state.

Advantageously, the first coupled state accompanies the second decoupled state. Preferably, the second coupled state accompanies the first decoupled state.

Advantageously, the respective switching unit can be switched into a neutral state, in particular, for example, in such a way that the first coupling element and the second coupling element can be moved in respective neutral positions that bring about the neutral state, in particular in an axial direction of the gear unit and/or translationally and/or relative to the housing. In the neutral state, the first switching unit, for example, is located in the first decoupled state, whilst the second switching unit, for example, is located in the second decoupled state. In the neutral state, the second rotor is thus decoupled, i.e. disconnected, from the gear unit. Thus, the neutral state is set, i.e. activated, to realize the single-engine operation. In other words, the switching units are located in the neutral state or the coupling elements in the neutral positions, in order to realize the single-engine operation. This avoids the situation where the first electric engine also drags the second rotor when, in single-engine operation, the outputs and thus the vehicle wheels are driven by the first rotor and thus by the first electric engine.

In order to be able to switch the switching units in a particularly needs-based and space-saving and cost-effective manner, it is provided in a further embodiment of the invention that the first switching unit is coupled to the second switching unit in such a way that the two switching units can be switched by means of a single actuator, common to the switching units, of the electric drive unit. For example, switching the first switching unit from the first coupled state to the first decoupled state is accompanied by switching the second switching unit from the second decoupled state to the second coupled state, and switching the first switching unit from the first decoupled state to the first coupled state is accompanied, for example, by switching the second switching unit from the second coupled state to the second decoupled state. The first coupling element and the second coupling element are therefore particularly preferably connected to each other in a rotationally and axially fixed manner, so that the first coupling element can only be moved axially together with the second coupling element.

An embodiment without the first switching unit and without the second switching unit is conceivable, of course, in which case, for example, the second rotor is permanently coupled to the ring gear in a torque-transmitting manner, in particular in a rotationally fixed manner, so that the torque can be distributed.

In order to be able to realize a particularly compact design of the electric drive unit and thus a particularly advantageous torque distribution, it is provided in a further embodiment of the invention that the first rotor, the second rotor, and the gear unit are all arranged coaxially to one another, wherein, when viewed in the axial direction of the gear unit and thus along the shaft rotational axis or the planetary gear set rotational axis, the first rotor, the second rotor, the two switching units, and the superimposed planetary gear set are arranged in the aforementioned sequence, i.e., in the following order one after the other, i.e., consecutively: The first rotor—the second rotor—the two switching units—the superimposed planetary gear set. In other words, it is preferably provided that in the axial direction of the gear unit, the second rotor follows the first rotor, the two switching units follow the second rotor and the superimposed planetary gear set follows the two switching units.

In order to be able to realize a particularly short length of the electric drive unit, in particular in the axial direction of the gear unit, it is provided in a further embodiment of the invention that the superimposed planetary gear set is arranged coaxially, axially overlapping and radially surrounding the differential. In particular, this means that the differential is arranged at least partially within the superimposed planetary gear set in the axial direction of the gear unit. Again, in other words, it is preferably provided that the superimposed planetary gear set surrounds, in particular completely circumferentially, at least one longitudinal region of the differential in the circumferential direction of the differential extending around the shaft rotational axis, so that the superimposed planetary gear set and the differential are, so to speak, stacked or nested in one another, in particular in such a way that the differential is arranged at least partially in the superimposed planetary gear set.

In order to be able to realize a particularly advantageous torque distribution, a first planetary gear stage is provided, which is located between the first differential shaft and the first vehicle wheel, i.e., downstream of the first differential shaft and upstream of the first vehicle wheel, with regard to a first torque flow via which the respective first output torque can be transmitted from the first differential shaft to the first vehicle wheel. Furthermore, a second planetary gear stage is provided, which is located between the second differential shaft and the second vehicle wheel, i.e., downstream of the second differential shaft and downstream of the second vehicle wheel, with regard to a second torque flow via which the respective second output torque can be transmitted from the first differential shaft to the second vehicle wheel. A respective gear stage is provided below the respective planetary gear stage, which is designed as a respective, further planetary gear.

Finally, it has proven to be particularly advantageous if the sum shaft is designed as a second ring gear, the first differential shaft as a double planetary carrier, and the second differential shaft as a second sun gear, meaning that the sum shaft is permanently connected to a second ring gear in a rotationally fixed manner, the first differential shaft is permanently connected to a double planetary carrier in a rotationally fixed manner and the second differential shaft is permanently connected to a second sun gear in a rotationally fixed manner. Thus, it is preferably provided that the differential is formed as a planetary differential, wherein a particularly advantageous torque distribution can be achieved in a particularly space-saving and weight favorable manner.

Further advantages, features and details of the invention can be seen from the following description of preferred exemplary embodiments and from the drawing. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

BRIEF DESCRIPTION OF THE DRAWING FIGURES

Figure 2:
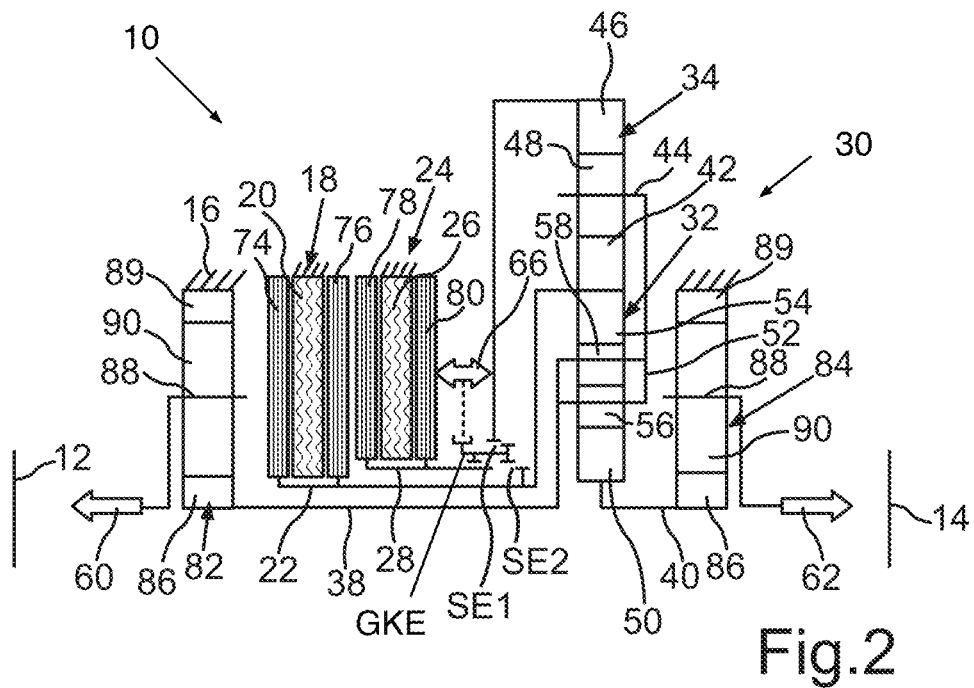

Here the drawing shows in:

FIG. 1 a schematic representation of a first embodiment of an electric drive unit for a motor vehicle, in particular for a motor car; and FIG. 2 a schematic representation of a second embodiment of the electric drive unit.

In the figures, identical or functionally identical elements are provided with the same reference signs.

DETAILED DESCRIPTION

FIG. 1 shows a schematic representation of a first embodiment of an electric drive unit 10 for a motor vehicle, in particular for a motor car. The electric drive unit 10 is assigned a vehicle axle, also simply referred to as an axle, of the motor vehicle, also simply referred to as a vehicle, wherein the vehicle axle has at least or exactly two vehicle wheels 12 and 14, shown particularly schematically in FIG. 1. The vehicle wheels 12 and 14, also simply referred to as wheels, may be component parts of the drive unit 10. The vehicle wheels 12 and 14 are arranged, for example, on opposite sides of the motor vehicle to each other in the transverse direction of the vehicle.

The electric drive unit 10 has a housing 16, shown particularly schematically in FIG. 1, and a first electric engine 18, which is referred to as a driving machine or is formed as a driving machine. The first electric engine 18 has a first stator 20, connected in particular in a rotationally fixed manner to the housing 16, and a first rotor 22. The rotor 22 can be driven by means of the stator 20 and thus can be rotated around a first engine rotational axis, in relation to the second stator 20 and in relation to the housing 16. The electric engine 18 can provide first drive torques via its rotor 22, in particular for driving the vehicle wheels 12 and 14. The drive unit 10 has a second electric engine 24, which has a second stator 26 and a second rotor 28. The second rotor 28 can be driven by means of the second stator 26 and thus can be rotated around a second engine rotational axis, in relation to the second stator 26 and in relation to the housing 16. In particular, the stator 26 is connected to the housing 16, in particular in a rotationally fixed manner. In the first embodiment, the electric engines 18 and 24 are arranged axially offset to each other. This means that the engine rotational axes run parallel to each other and are spaced apart from each other. The second electric engine 24 can provide second drive torques via its rotor 28, in particular for driving the vehicle wheels 12 and 14.

The electric drive unit 10 has a gear unit 30 also simply referred to as a transmission, which has a differential 32 and a superimposed planetary gear set 34. The superimposed planetary gear set 34 is also simply referred to as a planetary gear set or planetary set. The differential 32 has exactly three first shafts, arranged coaxially to each other, specifically a sum shaft 36, a first differential shaft 38, and a second differential shaft 40. The first shafts can be rotated around a shaft rotational axis common to the first shafts, relative to the housing 16. In this case, the electric engine 18 is arranged coaxially to the differential 32 and also coaxially to the planetary gear set (superimposed planetary gear set 34), so that the shaft rotational axis coincides with the first engine rotational axis. In the first embodiment, the differential is a first planetary gear and thus formed as a planetary differential. The planetary gear set is thus a second planetary gear. The planetary gear set has, in particular exactly, three other shafts, specifically a first sun gear 42, a first planetary carrier 44, and a first ring gear 46. The first sun gear 42, the first planetary carrier 44, which is also referred to as a bridge, and the first ring gear 46 can be rotated around a planetary gear set rotational axis of the planetary gear set, relative to the housing 16. In this case, the planetary gear set is arranged coaxially to the differential 32, so that the shaft rotational axis coincides with the planetary gear set rotational axis. Furthermore, the planetary gear set rotational axis and the shaft rotational axis coincide with the first engine rotational axis, so that the first electric engine 18 is arranged coaxially to the differential 32 and coaxially to the superimposed planetary gear set 34. In the first embodiment, the superimposed planetary gear set 34 is formed as a simple planetary gear set, so that the first planetary carrier 44 is formed as a simple planetary carrier. Thus, the planetary gear set (superimposed planetary gear set 34) has first planetary gears 48 that are rotatably mounted on the first planetary carrier 44. The respective, first planetary gear 48 meshes simultaneously with the first sun gear 42 and with the first ring gear 46.

The differential 32 formed as a planetary differential in the first embodiment has a second sun gear 50, a second planetary carrier 52, and a second ring gear 54. It is conceivable that the second differential shaft 40 comprises the second sun gear 50 or is connected, in particular permanently, in a rotationally fixed manner to the second sun gear 50. The first differential shaft 38 comprises the second planetary carrier 52 or is connected, in particular permanently, in a rotationally fixed manner to the second planetary carrier 52. Furthermore, in the first embodiment, the second ring gear 54 forms the sum shaft 36 or is connected, in particular permanently, in a rotationally fixed manner to the sum shaft 36.

The planetary differential is formed as a double planetary gear set, so that the second planetary carrier 52 is formed as a double planetary carrier. In this case, the differential 32 has first planetary gears 56 and second planetary gears 58. The planetary gears 56 and the planetary gears 58 are rotatably mounted on the second planetary carrier 52. The respective planetary gear 56 meshes with the second sun gear 50, however not with the second ring gear 54. The respective planetary gear 58 meshes with the second ring gear 54, however not with the second sun gear 50. Furthermore, in each case one, in particular exactly one, of the planetary gears 56 and in each case one, in particular exactly one, of the planetary gears 58 form a respective pair of planetary gears, wherein the planetary gears 56 and 58 of the respective pair of planetary gears mesh with each another.

The first rotor 22 is connected, in particular in a torque-transmitting manner, to the sum shaft 36 in such a way that the respective first drive torque that is or can be supplied by the rotor 22 can be introduced into the gear unit 30 via the sum shaft 36. In the present case, the rotor 22 is, in particular permanently, connected in a rotationally fixed manner to the sum shaft 36 and thus also, in particular permanently, connected in a rotationally fixed manner to the second ring gear 54. The first differential shaft 38 is coupled, in particular a torque-transmitting manner, to the vehicle wheel 12 in such a way that torques, illustrated by an arrow 60, can be discharged from the gear unit 30 via the first differential shaft 38 and transmitted onto the vehicle wheel 12. The second differential shaft 40 is coupled, in particular a torque-transmitting manner, to the second vehicle wheel 14 in such a way that torques, illustrated by an arrow 62, can be discharged from the gear unit 30 via the second differential shaft 40 and transmitted onto the second vehicle wheel 14. The respective torque, illustrated by the arrow 60, is also referred to as a first output torque, and the respective torque, illustrated by the arrow 62, is also referred to as a second output torque.

In the first embodiment, the first planetary carrier 44 is connected, in particular permanently, in a rotationally fixed manner to the second planetary carrier 52.

In order to be able to realize a particularly advantageous torque distribution, the first sun gear 42 is, in particular permanently, connected in a rotationally fixed manner to the sum shaft 36 and thus, in particular permanently, connected in a rotationally fixed manner to the second ring gear 54 and, in particular permanently, connected in a rotationally fixed manner to the rotor 22. In the first embodiment, the second rotor 28 can be coupled to the ring gear 46, in particular in a torque-transmitting manner, in such a way that the respective second output torque that is or can be supplied by the second rotor 28 can be introduced into the gear unit 30 via the ring gear 46.

In one embodiment (not shown in the figures), it is conceivable that the rotor 28 is permanently connected in a torque-transmitting manner to the first ring gear 46, in particular in a rotationally fixed manner.

However, in the first embodiment, the electric drive unit 10 has a first switching unit SE1, by means of which the second rotor 28 can be coupled in a torque-transmitting manner to the first ring gear 46 in such a way that the respective second drive torque that is or can be supplied by the second rotor 28 can be introduced into the gear unit via the first ring gear 46.

Furthermore, the electric drive unit advantageously has a second switching unit SE2, by means of which the second rotor 28 can be connected in a torque-transmitting manner to the sum shaft 36 and thus also to the sun gear 42 in such a way that the respective second drive torque that is or can be supplied by the second rotor 28 can be introduced into the gear unit 30 via the sum shaft 36 or the first sun gear 42.

Particularly advantageously, in the first embodiment, the first switching unit SE1 and the second switching unit SE2 are combined to form an overall switching unit GSE, which can be switched by means of a single actuator 64, common to the switching units SE1 and SE2 and shown particularly schematically in FIG. 1. In this case, the gear unit 10 comprises the common actuator 64. The overall switching unit GSE can be switched by means of the common actuator 64 between a first coupled state, a second coupled state and a neutral state.

The first switching unit SE1 advantageously has a first coupling element KE1 permanently coupled in a torque-transmitting manner to the second rotor 28 and which can be connected in a rotationally fixed manner to the first ring gear 46. Alternatively, and not shown, an alternative first coupling element could also be permanently connected to the first ring gear 46 in a rotationally fixed manner and could be coupled to the second rotor 28 in a torque-transmitting manner.

The second switching unit SE2 advantageously has a second coupling element KE2 permanently coupled in a torque-transmitting manner to the second rotor 28 and which can be coupled in a torque-transmitting manner to the sum shaft 36. Alternatively, and not shown, an alternative second coupling element could also be permanently coupled to the second sum shaft 36 in a rotationally fixed manner and could be coupled to the second rotor in a torque-transmitting manner.

Advantageously, the first coupling element KE1 and the second coupling element KE2 are arranged so as to be axially displaceable in relation to the shaft rotational axis. Advantageously, the first coupling element KE1 and the second coupling element KE2 are coupled to form a common coupling element GKE. Particularly advantageously, the first coupling element KE1 and the second coupling element KE2 are arranged axially fixed with respect to each other, i.e., cannot be axially displaced relative to each other, so that the first coupling element KE1 and the second coupling element KE2 can only be axially displaced together. Advantageously, the common coupling element GKE is permanently coupled in a torque-transmitting manner to the second rotor 28.

As illustrated in FIG. 1 by a double arrow 66, the common coupling element GKE can be moved particularly advantageously, for example by means of the actuator 64, in the axial direction of the gear unit 30 relative to the housing 16 in a translatory manner in the direction of the shaft rotational axis between at least a first coupled position that brings about the first coupled state, a second coupled position that brings about the second coupled state, and a neutral position that brings about the neutral state.

In the first coupled state, the rotor 28 is coupled in a torque-transmitting manner to the first ring gear 46 by means of the switching unit SE1, and in the second coupled state, the rotor 28 is coupled in a torque-transmitting manner to the sum shaft 36 by means of the second switching unit SE2. In the neutral state, the rotor 28 is coupled to neither the first ring gear 46 nor the sum shaft 36, but rather in the neutral state, the rotor 28 is decoupled, in particular completely, from the gear unit 30. It can be seen that the second ring gear 54 forms the sum shaft 36, wherein the second planetary carrier 52 forms the first differential shaft 38 and the second sun gear 50 forms the second differential shaft 40. This is realized in particular by the fact that the second planetary carrier 52 is designed as a double planetary carrier.

In the first embodiment, the rotor 28 has a rotor shaft 68 permanently connected in a rotationally fixed manner to a first gear wheel 70. A second gear wheel 72 is permanently connected in a rotationally fixed manner to the common coupling element GKE, wherein the gear wheels 70 and 72 permanently mesh with each other.

The common coupling element GKE is thus formed so as to be axially displaceable relative to the second gear wheel 72. For example, the common coupling element GKE and the second gear wheel 72 therefore each have splined teeth in a manner known per se.

For example, the gear wheels 70 and 72 are formed as spur gears. Thus, it can be seen that the rotor 28 can be coupled in a torque-transmitting manner either to the first ring gear 46 or to the sum shaft 36 via the gear wheels 70 and 72.

Particularly advantageously, a first force transmission area of the first switching unit SE1 and a second force transmission area of the second switching unit SE2 are radially surrounded, at least in some areas, by a connection shaft 92. The connection shaft 92 has at least one hollow shaft section. Advantageously, the first force transmission area and the second force transmission area are arranged axially overlapping and radially inside the hollow shaft section. The first force transmission area refers to an area of a first gear switching toothing or a first friction element arrangement of the first switching unit SE1 The second force transmission area refers to an area of a second gear switching toothing or a second friction element arrangement of the second switching unit SE2.

The connection shaft 92 is advantageously permanently connected in a rotationally fixed manner to the sum shaft 36. The connection shaft 92 is advantageously also permanently connected in a rotationally fixed manner to a second switching half of the second switching unit SE2. The second coupling element KE2 can be axially displaced towards the second switching half and brought into contact with the second switching half in a torque-transmitting manner.

Advantageously, the connection shaft 92 is arranged between the superimposed planetary gear set 34 and the second rotor 28 when viewed in the direction of the shaft rotational axis.

In the first embodiment, the differential 32 is arranged radially within the rotor 22, so that the rotor 22 completely surrounds at least one longitudinal region of the differential 32, in particular the entire differential 32, in a circumferential direction of the differential 32 and of the rotor 22 extending around the first engine rotational axis or around the shaft rotational axis. Furthermore, it is conceivable that at least one longitudinal region of the superimposed planetary gear set 34 is arranged in the rotor 22.

FIG. 2 shows a second embodiment of the drive unit 10. In the first embodiment, the respective electric engine 18 or 24 is formed as an internal rotor machine. The respective stator 20 or 26 completely surrounds at least one respective length range of the respectively associated rotor 22 or 28 in the respective circumferential direction of the respective electric engine 18 or 24 extending around the respective engine rotational axis.

In the second embodiment, the respective electric engine 18 or 24 is formed as an axial flux machine. The respective rotor 22 or 28 has, in each, case at least or exactly two rotor parts 74 and 76, or 78 and 80, wherein the stator 20 is arranged in the axial direction of the electric machine 18 between the rotor parts 74 and 76, and wherein the stator 26 is arranged in the axial direction of the electric machine 24 between the rotor parts 78 and 80. The rotor parts 74 and 76, or 78 and 80, are in particular permanently connected in a rotationally fixed manner with each other.

The first rotor 22, the second rotor 28, and the gear unit 30 are arranged coaxially to each other, wherein the first rotor 22, the second rotor 28, the two switching units SE1 and SE2, and the superimposed planetary gear set 34 are arranged one after the other in the following sequence when viewed in the axial direction of the gear unit 30: The first rotor 22—the second rotor 28—the two switching units SE1 and SE2—the superimposed planetary gear set 34. Furthermore, in the second embodiment, the superimposed planetary gear set 34 and the differential 32 are nested, i.e., stacked, in each other in such a way that the superimposed planetary gear set 34 completely surrounds at least one longitudinal region of the differential 32 in the circumferential direction of the differential 32 extending around the shaft rotational axis or the planetary gear set rotational axis or of the superimposed planetary gear set 34 extending in the circumferential direction.

Furthermore, in the second embodiment, a first gear stage 82 is assigned to the vehicle wheel 12, and a second gear stage 84 is assigned to the vehicle wheel 14. The gear stages 82 and 84 are designed as planetary gear stages, i.e., as further planetary gear sets or planetary gears, so that the respective gear stage 82, 84 has a respective further sun gear 86, a further respective planetary carrier 88, and a further respective ring gear 89. The gear stages are formed identically, with essentially identical sun gears 86, identical planetary carriers 88, and identical ring gears 89. The respective gear stage 82, 84 is formed as a simple planetary gear set. In this case, the other sun gear 86 of the first gear stage 82 is connected, in particular permanently, in a rotationally fixed manner to the first differential shaft 38. The other sun gear 86 of the second gear stage 84 is connected, in particular permanently, in a rotationally fixed manner to the second differential shaft 40. The two other ring gears 89 are connected, in particular permanently, in a rotationally fixed manner to the housing 16. The other planetary carrier 88 of the gear stage 82 is connected, in particular permanently, in a torque-transmitting, in particular rotationally fixed manner to the first vehicle wheel 12. The other planetary carrier 88 of the second gear stage 84 is connected, in particular permanently, in a torque-transmitting, in particular rotationally fixed manner to the second vehicle wheel 14. Furthermore, the respective gear stage 82, 84 has other planetary gears 90. The respective planetary gears 90 of the respective gear stage 82, 84 are rotatably mounted on the respective planetary carrier 88 of the respective gear stage 82, 84. The respective planetary gear 90 meshes with the respective sun gear 86 and, in particular simultaneously, with the respective ring gear 89.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 electric drive unit
12 vehicle wheel 14 vehicle wheel
16 housing
18 first electric engine
20 first stator
22 first rotor
24 second electric engine
26 second stator
28 second rotor
30 gear unit
32 differential
34 superimposed planetary gear set
36 sum shaft
38 first differential shaft
40 second differential shaft
42 first sun gear
44 first planetary carrier
46 first ring gear
48 planetary gear
50 second sun gear
52 second planetary carrier
54 second ring gear
56 planetary gear
58 planetary gear
60 arrow
62 arrow
64 actuator
66 double arrow
68 rotor shaft
70 gear wheel
72 gear wheel
74 rotor part
76 rotor part
78 rotor part
80 rotor part
82 first gear stage
84 second gear stage
86 further sun gear
88 further planetary carrier
89 further ring gear
90 planetary gear
92 connection shaft
GKE common coupling element
GSE overall switching unit
KE1 first coupling element
KE2 second coupling element
SE1 first switching unit
SE2 second switching unit

The invention claimed is:

1. An electric drive unit for a motor vehicle, the electric drive unit comprising:
a first electric engine having a first rotor;
a second electric engine having a second rotor;
a gear unit comprising
a differential having exactly three first shafts arranged coaxially to each other, wherein the exactly three first shafts are
a sum shaft to which the first rotor is connected in such a way that torques supplied by the first rotor are introducible into the gear unit via the sum shaft;
a first differential shaft coupled to a first vehicle wheel in such a way that torques are dischargeable from the gear unit via the first differential shaft and transmitted onto the first vehicle wheel; and
a second differential shaft coupled to a second vehicle wheel in such a way that torques are dischargeable from the gear unit via the second differential shaft and transmitted onto the second vehicle wheel;
a superimposed planetary gear set which has exactly three further shafts, wherein the exactly three further shafts are
a sun gear;
a planetary carrier connected in a rotationally fixed manner to the first differential shaft; and
an ring gear;
a first switching unit configured to couple the second rotor to the ring gear in such a way that torques supplied by the second rotor are introducible into the gear unit via the ring gear; and
a second switching unit configured to couple the second rotor to the sum shaft in such a way that torques supplied by the second rotor are introducible into the gear unit via the sum shaft,
wherein the sun gear is connected to the sum shaft in a rotationally fixed manner.

2. The electric drive unit of claim 1, wherein the first switching unit is coupled to the second switching unit in such a way that the first and second switching units are switchable by a single actuator.

3. The electric drive unit of claim 1, wherein the first rotor, the second rotor, and the gear unit are arranged coaxially to each other, wherein the first rotor, the second rotor, the first and second switching units, and the superimposed planetary gear set are arranged in the following sequence when viewed in an axial direction of the gear unit: 1) the first rotor, 2) the second rotor, 3) the first and second switching units, 4) the superimposed planetary gear set.

4. The electric drive unit of claim 1, wherein the superimposed planetary gear set is arranged coaxially, axially overlapping and radially surrounding the differential.

5. The electric drive unit of claim 1, further comprising:
a first planetary gear stage located between the first differential shaft and the first vehicle wheel with regard to a torque flow via which torques are transmittable from the first differential shaft onto the first vehicle wheel; and
a second planetary gear stage located between the second differential shaft and the second vehicle wheel with regard to a torque flow via which torques are transmittable from the first differential shaft onto the second vehicle wheel.

6. The electric drive unit of claim 1, wherein the sum shaft is a second ring gear, the first differential shaft is a double planetary carrier, and the second differential shaft is a second sun gear.

7. The electric drive unit of claim 1, further comprising:
a connection shaft connected to the sum shaft in a rotationally fixed manner and having at least one hollow shaft section, wherein a first force transmission area of the first switching unit and a second force transmission area of the second switching unit are arranged inside the hollow shaft section.

8. The electric drive unit of claim 7, wherein the connection shaft is connected to a switching half of the second switching unit in a rotationally fixed manner.

* * * * *